(12) United States Patent
Yamamoto et al.

(10) Patent No.: US 11,530,631 B2
(45) Date of Patent: Dec. 20, 2022

(54) ENGINE OIL STATE CONTROL DEVICE (71) Applicant: MITSUBISHI HEAVY INDUSTRIES ENGINE & TURBOCHARGER, LTD., Sagamihara (JP)

(72) Inventors: Takayuki Yamamoto, Tokyo (JP); Takuya Kumagai, Tokyo (JP); Tomohide Yamada, Tokyo (JP); Kazuki Nishizawa, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 236 days.

(21) Appl. No.: 16/628,959

(22) PCT Filed: Oct. 27, 2017

(86) PCT No.: PCT/JP2017/038938
§ 371 (c)(1),
(2) Date: Jan. 6, 2020

(87) PCT Pub. No.: WO2019/082387
PCT Pub. Date: May 2, 2019

(65) Prior Publication Data
US 2020/0224564 A1 Jul. 16, 2020

(51) Int. Cl.
*F01M 5/00* (2006.01)
*F01M 1/16* (2006.01)

(52) U.S. Cl.
CPC .......... *F01M 5/002* (2013.01); *F01M 5/001* (2013.01); *F01M 1/16* (2013.01); *F01M 5/005* (2013.01);
(Continued)

(58) Field of Classification Search
CPC .............. F02D 2250/11; F02D 41/029; F01M 2001/165; F01M 5/001
(Continued)

(56) References Cited

U.S. PATENT DOCUMENTS 9,020,737 B2 4/2015 Murase
2006/0065230 A1* 3/2006 Hoi .................. F01M 5/007
123/196 AB (Continued)

FOREIGN PATENT DOCUMENTS

EP 1586752 A1 10/2005
JP 10-317936 A 12/1998
(Continued)

OTHER PUBLICATIONS

Extended European Search Report for European Application No. 17929849.2, dated May 18, 2020.
(Continued)

*Primary Examiner* — Long T Tran
*Assistant Examiner* — James J Kim
(74) *Attorney, Agent, or Firm* — Birch, Stewart, Kolasch & Birch, LLP (57) ABSTRACT

An engine oil state control device for controlling a fuel mixture ratio of a fuel mixed in an engine oil of an engine on which a predetermined combustion control is performed includes comprising a fuel mixture ratio acquisition part configured to acquire the fuel mixture ratio, and an oil temperature rise control part configured to perform an oil temperature rise control for increasing an evaporation rate of the fuel mixed in the engine oil if the fuel mixture ratio is equal to or greater than a first threshold.

18 Claims, 5 Drawing Sheets (52) U.S. Cl.
CPC .... *F01M 2001/165* (2013.01); *F01P 2060/04* (2013.01); *F02D 2250/11* (2013.01)

(58) Field of Classification Search
USPC .................................................. 123/196 AB
See application file for complete search history.

(56) References Cited

U.S. PATENT DOCUMENTS

| | | | |
|---|---|---|---|
| 2007/0006642 A1* | 1/2007 | Lin | G01N 33/2835 73/114.55 |
| 2007/0131193 A1 | 6/2007 | Takahashi | |
| 2007/0156322 A1 | 7/2007 | Soga et al. | |
| 2012/0109498 A1* | 5/2012 | Murase | F02D 41/042 701/103 |
| 2012/0186236 A1 | 7/2012 | Aoki et al. | |
| 2013/0182743 A1* | 7/2013 | Nishi | G01K 1/14 374/144 |
| 2014/0174408 A1 | 6/2014 | Pfeiffer | |
| 2016/0084126 A1 | 3/2016 | Jo et al. | |
| 2016/0102623 A1* | 4/2016 | Hakeem | F02D 41/0007 701/113 |
| 2016/0194999 A1 | 7/2016 | Hakeem et al. | |
| 2016/0377022 A1* | 12/2016 | Tofu | F02F 1/10 123/41.82 R |
| 2017/0009621 A1* | 1/2017 | Ogata | F02D 35/026 |
| 2017/0022879 A1* | 1/2017 | Gonze | F01M 11/10 |
| 2017/0074177 A1* | 3/2017 | Okubo | B60W 10/06 |
| 2018/0135482 A1* | 5/2018 | Bailey | F01N 3/0232 |
| 2018/0273015 A1* | 9/2018 | Martin | B60W 10/06 |

FOREIGN PATENT DOCUMENTS

| | | |
|---|---|---|
| JP | 2002-129957 A | 5/2002 |
| JP | 2004-190513 A | 7/2004 |
| JP | 2004-293394 A | 10/2004 |
| JP | 2005-299592 A | 10/2005 |
| JP | 2007-162569 A | 6/2007 |
| JP | 2010-185282 A | 8/2010 |
| JP | 2010-249252 A | 11/2010 |
| JP | 2011-137381 A | 7/2011 |
| JP | 5381422 B2 | 1/2014 |
| JP | 2014-218897 A | 11/2014 |
| JP | 2015-155651 A | 8/2015 |

OTHER PUBLICATIONS

International Preliminary Report on Patentabiltiy and Written Opinion of the International Searching Authority for International Application No. PCT/JP2017/038938, dated May 7, 2020, with English translation.
International Search Report for International Application No. PCT/JP2017/038938, dated Dec. 26, 2017.

* cited by examiner

ENGINE OIL STATE CONTROL DEVICE

TECHNICAL FIELD

The present disclosure relates to recovering engine oil diluted with fuel.

BACKGROUND ART

A diesel engine is equipped with an exhaust gas treatment device including a diesel oxidation catalyst (DOC) disposed in an exhaust passage and a diesel particulate filter (DPF) disposed on the downstream side of the DOC. The diesel particulate filter (DPF) is a device for collecting particulate matters (PM) contained in exhaust gas discharged from the diesel engine. The DPF is normally formed of ceramic or the like in a honeycomb-shaped monolith with adjacent vents closed alternately on the inlet side and the outlet side so that exhaust gas passes through filtering walls which remove the PM. The DPF may support a catalyst. Accumulation of the PM in the DPF eventually brings about blockage, which leads to not only a decrease in the PM-collecting performance of the DPF but also to an increase in the exhaust pressure and thus has a negative effect on the fuel efficiency. In view of this, it is necessary to perform forced regeneration to remove the PM accumulated in the DPF every time a PM-accumulation amount reaches a predetermined amount or an engine operation time reaches a predetermined time.

One typical method of DPF forced regeneration uses a late-post injection into an engine cylinder. In this method, fuel is injected at a timing unrelated to engine combustion (latter part of piston expansion stroke after completion of combustion) such that a large amount of unburned fuel is contained in the exhaust gas, and the fuel is combusted by the DOC disposed in front of the DPF. The combustion of fuel increases the exhaust gas temperature to about 600° C. to 700° C., resulting in combustion of the PM in the DPF. However, in the late-post injection, a part of fuel impinges on the cylinder wall surface and is transported down into an oil pan. This fuel dilutes engine oil and causes damage to the engine.

To solve this problem, Patent Document 1 discloses estimating the amount of fuel mixed into engine oil and controlling the interval of DPF forced regeneration process and the operation mode (air excess ratio) of the engine so that the fuel mixture ratio is not greater than a control value. With this method, even when the late-post injection is performed for the DPF forced regeneration, it is possible to suppress a reduction in the lubricity of the engine oil and a risk of ignition due to a reduction in flash point which result from an increase in the fuel mixture ratio of the engine oil. Further, Patent Document 2 discloses means for determining whether engine oil which degrades by blowby gas (NOx) reaches a predetermined degradation degree, in which if the engine oil reaches the predetermined degradation degree, compression ratio is decreased by a variable compression ratio mechanism configured to change the mechanical compression ratio of an internal combustion engine. By decreasing the compression ratio, the combustion temperature is decreased, and the generation amount of NOx is decreased. As a result, NOx contained in blowby gas is reduced. Thus, it is possible to suppress progress of degradation of the engine oil due to NOx thereafter, and it is possible to reduce a risk of poor lubrication due to degradation of the engine oil.

CITATION LIST

Patent Literature

Patent Document 1: JP2011-137381A
Patent Document 2: JP2014-218897A

SUMMARY

Problems to be Solved

However, the method disclosed in Patent Document 1 aims at reducing the amount of fuel that will be mixed into the engine oil due to the late-post injection by lengthening the interval of the DPF forced regeneration. Patent Document 2 aims at suppressing progress of degradation of the engine oil due to NOx after the mechanical compression ratio of the internal combustion engine is changed. In other words, neither method disclosed in Patent Document 1 and Patent Document 2 favorably reduces the amount of fuel mixed in the engine oil diluted with the fuel and aims at recovering the engine oil diluted with the mixed fuel.

In view of the above, an object of at least one embodiment of the present invention is to provide an engine oil state control device that can reduce fuel mixed in engine oil by temperature rise control of the engine oil.

Solution to the Problems (1) An engine oil state control device according to at least one embodiment of the present invention, for controlling a fuel mixture ratio of a fuel mixed in an engine oil of an engine on which a predetermined combustion control is performed, comprises: a fuel mixture ratio acquisition part configured to acquire the fuel mixture ratio; and an oil temperature rise control part configured to perform an oil temperature rise control for increasing an evaporation rate of the fuel mixed in the engine oil if the fuel mixture ratio is equal to or greater than a first threshold.

With the above configuration (1), if the fuel mixture ratio of fuel mixed in the engine oil (mixed fuel) is equal to or greater than the first threshold, the oil temperature rise control is performed in addition to the normal control of the predetermined combustion control, so that the temperature of the engine oil is further increased. As a result, evaporation of the mixed fuel in the engine oil is promoted, and the mixed fuel is favorably reduced (removed). Thus, it is possible to not only prevent dilution of the engine oil with the mixed fuel but also recover the engine oil diluted with the mixed fuel. Further, since the fuel mixture ratio in the engine oil is reduced, it is possible to suppress a reduction in the lubricity of the engine oil and a risk of ignition due to a reduction in flash point which result from an increase in the fuel mixture ratio in the engine oil.

(2) In some embodiments, in the above configuration (1), the oil temperature rise control includes an output increase control for increasing an output power of the engine compared to an output power when the predetermined combustion control is performed.

With the above configuration (2), the engine is heated by the output increase control, so that the temperature of the engine oil can be increased by heat transfer from the heated engine.

(3) In some embodiments, in the above configuration (1), the oil temperature rise control includes a control for increasing a set value of an idling speed of the engine.

With the above configuration (3), the fuel consumption of the engine is increased during idling, which does not affect the running of a vehicle equipped with the engine or the operating of a construction machine, and the amount of heat due to combustion is increased. Thus, the temperature of the engine oil can be increased by heat of the engine.

(4) In some embodiments, in any one of the above configurations (1) to (3), the oil temperature rise control includes a combustion temperature rise control for increasing a combustion temperature in a cylinder of the engine compared to a combustion temperature in the cylinder when the predetermined combustion control is performed.

With the above configuration (4), by increasing the combustion temperature of fuel by the combustion temperature rise control, the engine is heated, so that the temperature of the engine oil can be increased by heat transfer from the heated engine.

(5) In some embodiments, in the above configuration (4), the combustion temperature rise control includes at least one of a control for decreasing an air excess ratio of the engine compared to an air excess ratio determined in accordance with the predetermined combustion control, or a control for increasing an EGR rate of the engine compared to an EGR rate determined in accordance with the predetermined combustion control.

With the above configuration (5), by increasing the combustion temperature of fuel by the reduction in air excess ratio or the increase in EGR rate, the engine is heated, so that the temperature of the engine oil can be increased by heat transfer from the heated engine.

(6) In some embodiments, in any one of the above configurations (1) to (5), the engine includes: an oil circulation line through which the engine oil circulates; an oil cooler, disposed on the oil circulation line, for cooling the engine oil; and a cooler bypass line bypassing the oil cooler and connecting portions of the oil circulation line upstream and downstream of the oil cooler, and the oil temperature rise control includes a control for increasing a flow rate of the engine oil flowing through the cooler bypass line compared to a flow rate of the engine oil flowing through the cooler bypass line when the predetermined combustion control is performed.

With the above configuration (6), by increasing the flow rate of the engine oil bypassing the oil cooler, the degree of cooling of the engine oil by the oil cooler is reduced compared to when the predetermined combustion control is performed, so that the temperature of the engine oil can be increased.

(7) In some embodiments, in any one of the above configurations (1) to (6), the engine includes: a cooling water circulation line through which cooling water circulates; a radiator, disposed on the cooling water circulation line, for cooling the cooling water; and a radiator bypass line bypassing the radiator and connecting portions of the cooling water circulation line upstream and downstream of the radiator, and the oil temperature rise control includes a control for increasing a flow rate of the cooling water flowing through the radiator bypass line compared to a flow rate of the cooling water flowing through the radiator bypass line when the predetermined combustion control is performed.

With the above configuration (7), by increasing the flow rate of the cooling water bypassing the radiator and thereby increasing the temperature of the cooling water, the engine is heated. Thus, the temperature of the engine oil can be increased by heat transfer from the heated engine.

(8) In some embodiments, in any one of the above configurations (1) to (7), the engine includes: a cooling water circulation line through which cooling water circulates; a radiator, disposed on the cooling water circulation line, for cooling the cooling water; and a heater disposed on the cooling water circulation line, and the oil temperature rise control includes a control for operating the heater.

With the above configuration (8), the cooling water flowing through the cooling water circulation line is heated by the heater, and the engine is heated by the heated cooling water. Thus, the temperature of the engine oil can be increased by heat transfer from the heated engine.

(9) In some embodiments, in any one of the above configurations (1) to (8), the engine includes an oil viscosity sensor for detecting a viscosity of the engine oil, and the fuel mixture ratio acquisition part calculates the fuel mixture ratio from the viscosity of the engine oil detected by the oil viscosity sensor, based on a map showing a relationship between the viscosity of the engine oil and the fuel mixture ratio.

With the above configuration (9), it is possible to acquire the fuel mixture ratio by measuring the viscosity of the engine oil.

(10) In some embodiments, in any one of the above configurations (1) to (9), the engine oil state control device further comprises an output decrease control part configured to perform an output decrease control for decreasing an output power of the engine compared to an output power when the predetermined combustion control is performed, if the fuel mixture ratio is equal to or greater than a second threshold and less than a third threshold, wherein the second threshold is greater than the first threshold.

With the above configuration (10), if the fuel mixture ratio is equal to or greater than the second threshold and less than the third threshold, the output decrease control is performed in addition to the normal control of the predetermined combustion control, so that the output power of the engine is decreased. Thus, even when the fuel mixture level in the engine oil is high (equal to or greater than the second threshold and less than the third threshold), it is possible to suppress damage to the engine due to dilution of the engine oil with the mixed fuel.

(11) In some embodiments, in the above configuration (10), the engine oil state control device further comprises a start limiting control part configured to perform a start limiting control for limiting starting of the engine if the fuel mixture ratio is equal to or greater than the third threshold.

With the above configuration (11), if the fuel mixture ratio is equal to or greater than the third threshold, the start limiting control is performed in addition to the normal control of the predetermined combustion control, so that the engine is stopped. Thus, since the engine is prevented from operating, even when the fuel mixture level in the engine oil is particularly high (equal to or greater than the third threshold), it is possible to avoid damage to the engine due to dilution of the engine oil with the mixed fuel.

(12) In some embodiments, in any one of the above configurations (1) to (11), the engine includes: an exhaust gas treatment device including a diesel particulate filter, disposed in an exhaust passage of the engine, for collecting particles in an exhaust gas and a diesel oxidation catalyst disposed upstream of the diesel particulate filter; and a forced regeneration control part configured to, if a predetermined execution condition is satisfied, inject a fuel at a timing that does not contribute to combustion in a combustion chamber of the engine to perform a forced regeneration treatment on the diesel particulate filter.

With the above configuration (12), in the engine in which fuel is mixed to the engine oil by the late-post injection, evaporation of the mixed fuel in the engine oil is promoted. Thus, it is possible to not only prevent dilution of the engine oil with the mixed fuel but also recover the engine oil diluted with the mixed fuel.

Advantageous Effects

At least one embodiment of the present invention provides an engine oil state control device that can reduce fuel mixed in engine oil by temperature rise control of the engine oil.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

On the other hand, an expression such as "comprise", "include", "have", "contain" and "constitute" are not intended to be exclusive of other components.

Figure 1:
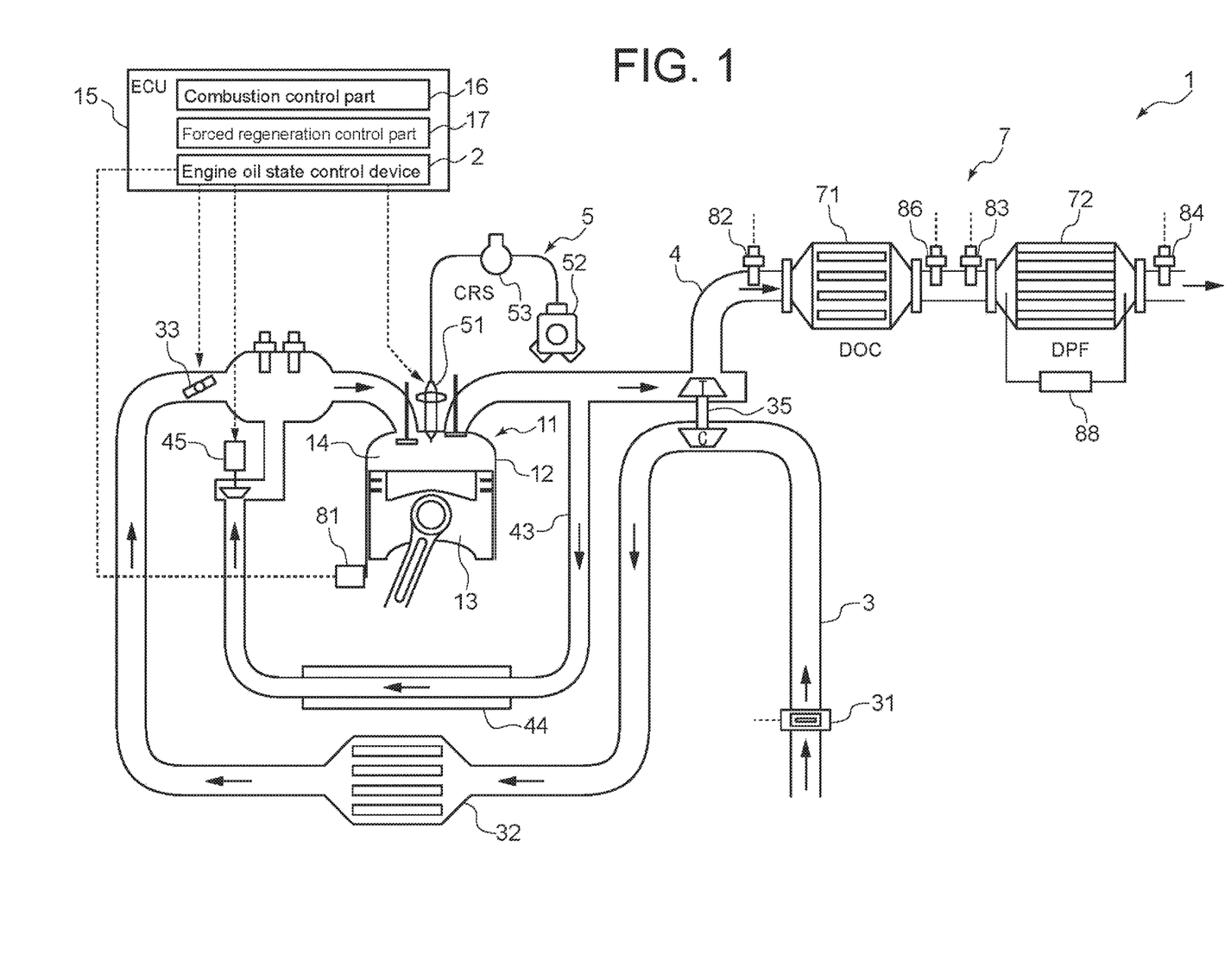
FIG. 1 is a schematic overall configuration diagram of an engine according to an embodiment of the present invention.
Figure 2:
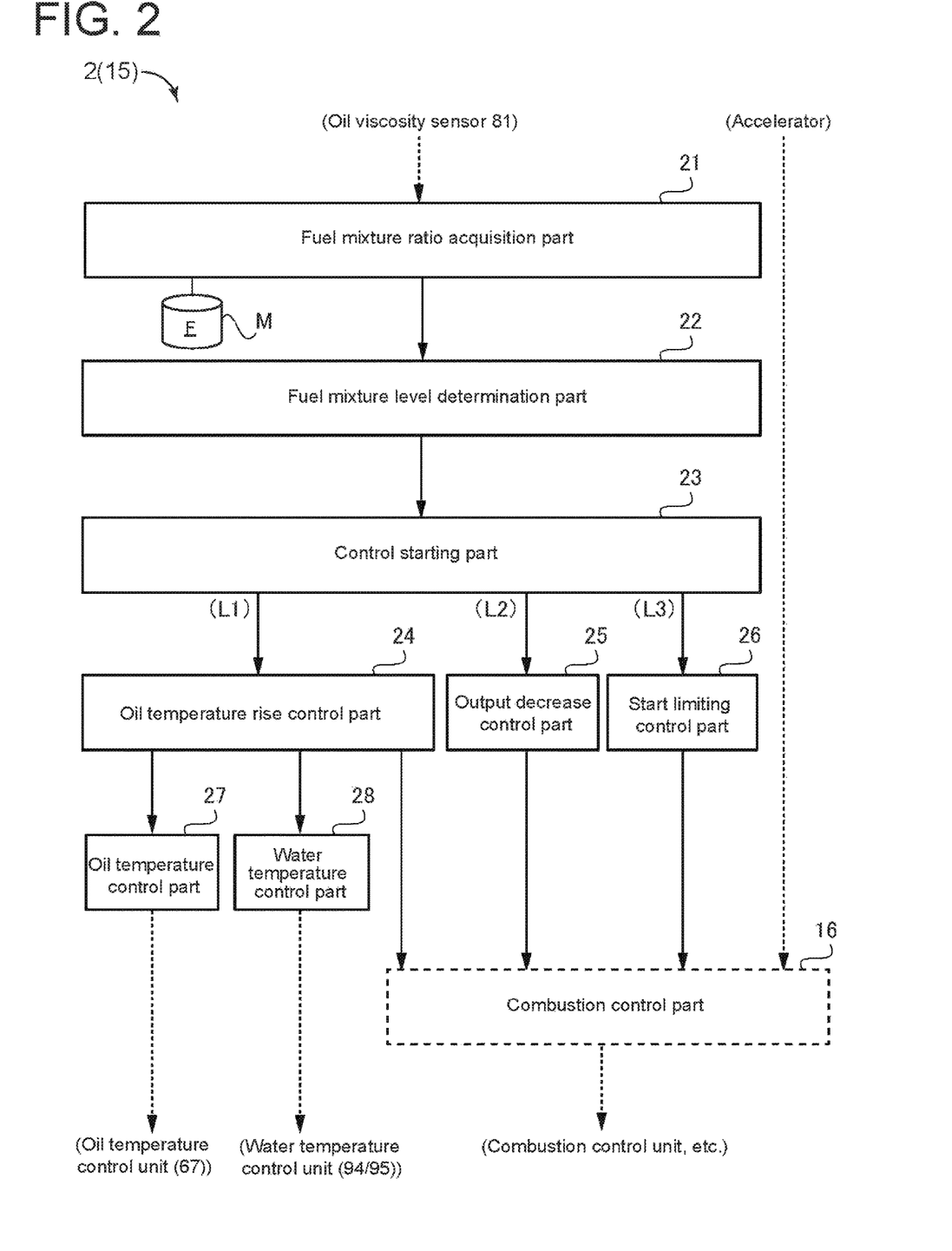
FIG. 2 is a configuration block diagram of an engine oil state control device according to an embodiment of the present invention.
Figure 3:
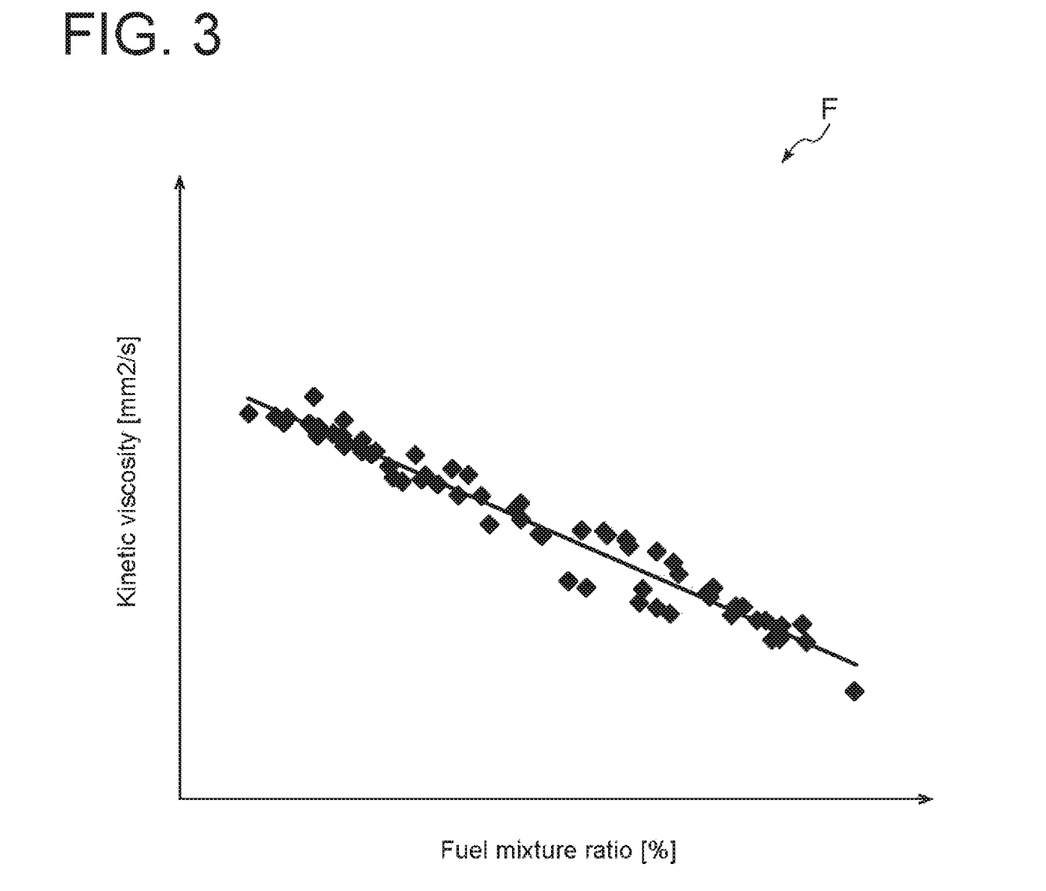
FIG. 3 is a diagram for describing a relationship between the viscosity of engine oil and the fuel mixture ratio according to an embodiment of the present invention.
Figure 4:
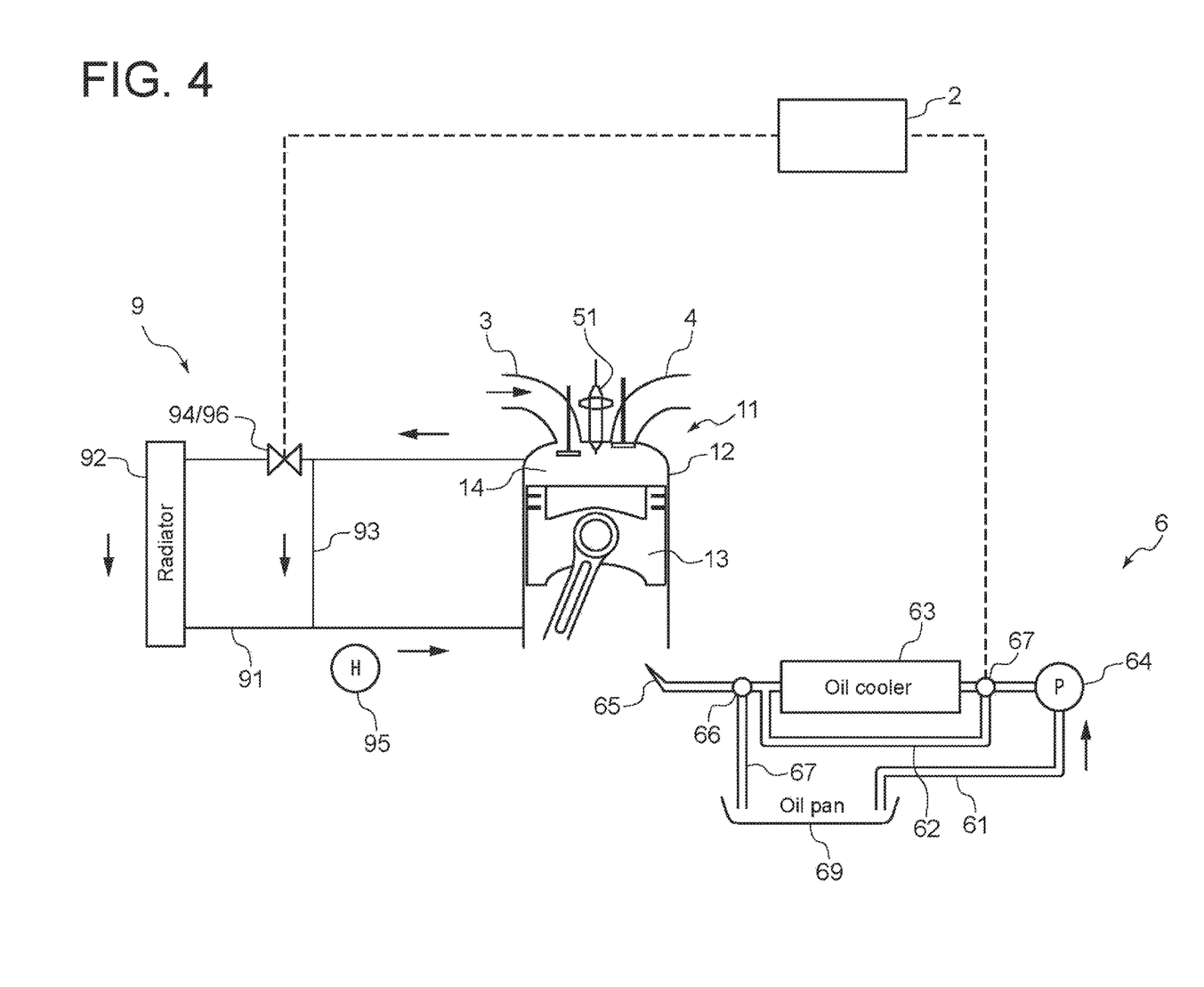
FIG. 4 is a diagram of a cooling device of an engine according to an embodiment of the present invention.
Figure 5:
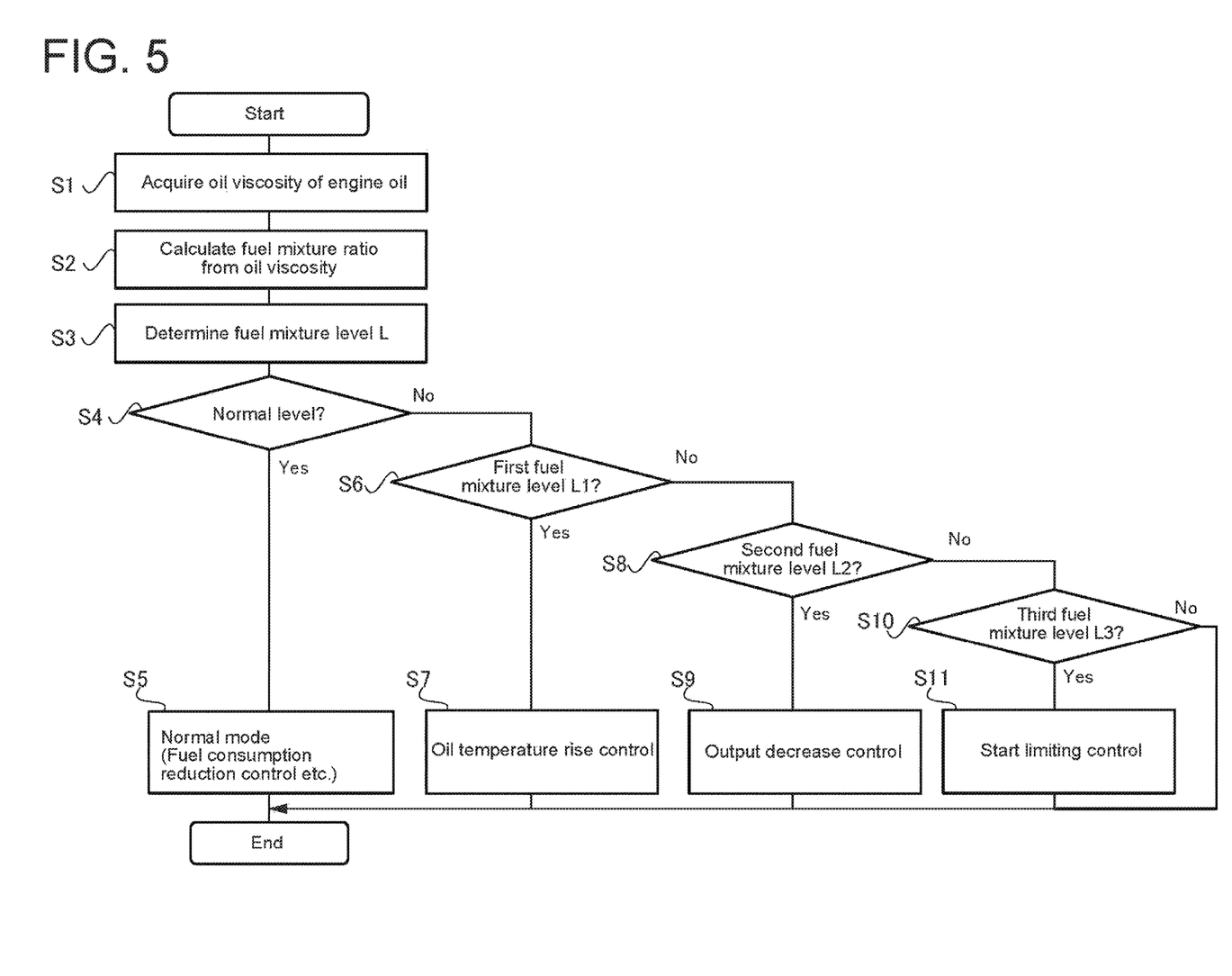
FIG. 5 is a control flow of an engine oil state control device according to an embodiment of the present invention.

FIG. 1 is a schematic overall configuration diagram of an engine 1 according to an embodiment of the present invention. FIG. 2 is a configuration block diagram of an engine oil state control device 2 according to an embodiment of the present invention. FIG. 3 is a diagram for describing a relationship between the viscosity of engine oil and the fuel mixture ratio according to an embodiment of the present invention. FIG. 4 is a diagram of a cooling device of the engine 1 according to an embodiment of the present invention. FIG. 5 is a control flow of the engine oil state control device 2 according to an embodiment of the present invention. The engine oil state control device 2 is a device for controlling the fuel mixture ratio of fuel mixed in the engine oil (hereinafter, appropriately referred to as mixed fuel) in the engine 1 on which a predetermined combustion control, such as combustion control to reduce the fuel consumption, is performed. The engine oil state control device 2 acquires the fuel mixture ratio based on information detected from the engine 1 and controls the engine 1 based on the fuel mixture ratio (see FIG. 1).

First, the engine 1 according to the embodiments shown in in FIGS. 1 and 4 will be described. The engine 1 is a diesel engine mounted on a vehicle, for instance, and fuel is supplied into a combustion chamber 14 defined by a cylinder 12 and an upper surface of a piston 13 of an engine body 11 by a common rail system 5 (CRS). In the common rail system 5, fuel in a fuel tank (not shown) is stored in a common rail 53 at high pressure with a high-pressure pump 52, and the high-pressure fuel stored in the common rail 53 is injected to the combustion chamber 14 of the engine body 11 by an injector 51 for injecting fuel. The injection amount and the injection timing of fuel from the injector 51 are controlled by an engine control ECU 15 for controlling the engine 1. More specifically, the engine control ECU 15 includes a combustion control part 16 configured to perform a predetermined combustion control, and the injection amount and the injection timing of fuel are determined in accordance with the predetermined combustion control. The engine control ECU 15 (electronic control device) comprises a computer, including a CPU (processor, not shown) and a memory M (storage device) such as ROM and RAM. The CPU operates (e.g. computation of data) in accordance with program instructions loaded to a main storage device, and thereby functional parts such as the combustion control part 16, a forced regeneration control part 17, and an engine oil state control device 2 described later are implemented.

Further, the engine body 11 is connected to an intake passage 3 for guiding air (intake air) sucked from the outside via an intake duct (not shown) to the combustion chamber 14 of the engine body 11 and an exhaust passage 4 for guiding exhaust gas (combustion gas) produced by combustion in the combustion chamber 14 to the outside. The air passing through the intake passage 3 is compressed by a turbocharger 35 of the engine 1. The air compressed by the turbocharger 35 passes through an inter cooler 32 for increasing the intake air density by cooling, followed by passing through an intake throttle 33 disposed in the intake passage 3. Further, the turbocharger 35 includes a turbine T rotatable by exhaust gas discharged from the engine body 11 and a compressor C rotationally driven by the turbine T. When the turbine T disposed in the exhaust passage 4 is driven by the exhaust gas, the compressor C disposed in the intake passage 3 rotates and compresses the air flowing through the intake passage 3 downstream. The flow rate of the air (fresh air) is detected by an intake flow rate meter 31 disposed on the intake passage 3, and is input to the engine control ECU 15 for various control.

Meanwhile, a portion of the exhaust passage 4 upstream of the turbine T (adjacent to the combustion chamber 14) is connected to one end of an EGR passage 43 so as to diverge from the exhaust passage 4, and the other end of the EGR passage 43 is connected to a portion of the intake passage 3 downstream of the intake throttle 33 (adjacent to the combustion chamber 14), so that a part of the exhaust gas flowing through the exhaust passage 4 can be returned to the intake passage 3. The EGR passage 43 is provided with an EGR cooler 44 and an EGR valve 45 arranged in this order from the exhaust passage 4. The opening degree of the EGR valve 45 is controlled by the combustion control part 16 of the engine control ECU 15 so that a desired EGR rate (amount of exhaust gas returned to intake passage 3/amount of air supplied into combustion chamber 14) is achieved.

Further, the exhaust gas having passed through the turbine T in the exhaust passage 4 passes through an exhaust gas treatment device 7 disposed on the exhaust passage 4. The exhaust gas treatment device 7 includes a DPF 72 and a DOC 71 disposed upstream of the DPF 72. The DPF 72 is a filter for collecting PM (mainly, soot) in the exhaust gas and accumulates the PM upon operation of the engine 1. On the other hand, the DOC 71 (oxidation catalyst) is a catalyst for detoxifying hydrocarbon (HC) and carbon monoxide (CO) in the exhaust gas. Further, the DOC 71 has a function to increase the exhaust gas temperature by heat of oxidation reaction of unburned components in the exhaust gas when forced regeneration is performed for combusting the PM collected by the DPF 72. In the present embodiment, the forced regeneration process is performed under control of a forced regeneration control part 17 of the engine control ECU 15, using a large amount of unburned fuel contained in the exhaust gas by a late-post injection through the injector 51. The late-post injection means injecting fuel at a timing unrelated to combustion in the combustion chamber 14 (i.e., at a timing that does not contribute to combustion in the combustion chamber 14, for instance in a latter part of the piston expansion stroke after completion of combustion). The unburned fuel supplied to the exhaust gas by the late-post injection is combusted by the DOC 71 disposed in front of the DPF 72. By combustion of the unburned fuel using the DOC 71, the exhaust gas temperature rises to about 600° C. to 700° C., by which the PM in the DPF 72 disposed downstream of the DOC 71 is combusted.

The forced regeneration control part 17 is configured to perform forced regeneration process if a predetermined execution condition is satisfied. The predetermined execution condition (execution timing) may include, for instance: an estimated value of the PM accumulation amount on the DPF 72 exceeding a predetermined value; an operation time of the engine 1 exceeding a predetermined period of time; and an accumulated fuel injection amount of the engine 1 from the injector 51 exceeding a predetermined amount. The PM accumulation amount on the DPF 72 may be estimated by detecting a differential pressure between the upstream and downstream sides of the DPF 72 with a DPF differential pressure sensor 88, for instance. Alternatively, the PM accumulation amount may be estimated by detecting the engine rotation speed, the fuel injection amount, the air flow rate, or the DPF temperature (e.g., detection value of a DPF outlet temperature sensor 84), estimating the PM regeneration amount by natural regeneration inside the DPF 72 and the PM discharge amount from the engine 1 based on a map stored in advance in the forced regeneration control part 17, and subtracting the PM regeneration amount from the PM discharge amount. Between the DOC 71 and the DOC 72 in the exhaust passage 4, a temperature sensor 83 for detecting the temperature and a pressure sensor 86 for detecting the pressure at the inlet of the DPF 72 (the outlet of the DOC 71) are disposed, and the detected values are input to the engine control ECU 15 for various control.

However, if the forced regeneration process of the DPF 72 is performed by the late-post injection, a part of the fuel injected by the late-post injection impinges on the cylinder wall surface and is transported down into an oil pan 69 (see FIG. 4 described later) attached to the lower surface of the a cylinder block constituting the engine body 11. As a result, the fuel is mixed to the engine oil and dilutes the engine oil. The oil pan 69 is used for storing the engine oil serving as lubricant oil for engine parts. The engine oil stored in the oil pan 69 is sucked by an oil pump 64 and is supplied to engine parts again, as described later. Accordingly, if the engine oil is diluted with the mixed fuel, the lubricity of the engine oil may be reduced, and a risk (oil dilution risk) of ignition due to a reduction in flash point may occur, which may cause damage to the engine 1 (engine body 11).

Therefore, the engine 1 includes an engine oil state control device 2 for controlling the fuel mixture ratio of fuel mixed in the engine oil of the engine 1 on which the predetermined combustion control is performed.

The engine oil state control device 2 will now be described with reference to FIGS. 2 and 3. As shown in FIG. 2, the engine oil state control device 2 includes a fuel mixture ratio acquisition part 21 and an oil temperature rise control part 24. In the embodiment shown in FIGS. 1 and 2, the engine oil state control device 2 further includes a fuel mixture level determination part 22 and a control starting part 23. In the present embodiment, as shown in FIG. 1, the engine oil state control device 2 is implemented as a functional part of the engine control ECU 15. However, in other embodiments, the engine oil state control device 2 may be implemented by a computer device such as an ECU (electronic control device) formed separately from the engine control ECU 15. Each functional part will now be described.

The fuel mixture ratio acquisition part 21 acquires the fuel mixture ratio of fuel mixed in the engine oil. The fuel mixture ratio is the proportion of fuel mixed in the engine oil. In the embodiment shown in FIG. 2, the fuel mixture ratio acquisition part 21 is configured to acquire the fuel mixture ratio, based on the viscosity of the engine oil. More specifically, the engine 1 has an oil viscosity sensor 81 for detecting the viscosity of the engine oil. The oil viscosity sensor 81 is configured to detect the viscosity of the engine oil in the oil pan 69 or an oil circulation line (described later). The detection value of the oil viscosity sensor 81 is input to the fuel mixture ratio acquisition part 21. The fuel mixture ratio acquisition part 21 acquires the fuel mixture ratio by calculating the fuel mixture ratio from the viscosity of the engine oil detected by the oil viscosity sensor 81, based on a map F (see FIG. 3) showing a relationship between the viscosity (e.g., kinetic viscosity) of the engine oil and the fuel mixture ratio. In the embodiment shown in FIG. 3, the map F is obtained by mapping (functionalizing) data previously obtained by experiments with approximation method such as the least squares method and is stored in advance in a non-volatile memory M of the engine oil state control device 2.

However, the method of acquiring the fuel mixture ratio by the fuel mixture ratio acquisition part 21 is not limited to the above method. For instance, the fuel mixture ratio acquisition part 21 may acquire the fuel mixture ratio by estimating the amount of fuel mixed in the engine oil by the forced regeneration process of the DPF 72. Specifically, a function that can estimate the fuel mixture amount from parameters at the time of forced regeneration process such as fuel pressure in the common rail 53, injection amount by the late-post injection, and DOC inlet temperature (detection value of a DOC inlet temperature sensor 82) may be generated in advance through experiments, and the fuel mixture amount may be calculated from the parameters at the time of forced regeneration process, based on this function that can calculate the fuel mixture amount. The function that can calculate the fuel mixture amount may have variables on structure, such as the diameter of the injection port of the injector 51 for fuel, the number of injection holes, and swirl ratio. By dividing the acquired fuel mixture ratio by the total amount of engine oil in the engine 1, the fuel mixture ratio may be calculated and acquired.

The fuel mixture level determination part 22 determines a fuel mixture level L based on the fuel mixture ratio. More specifically, the fuel mixture level determination part 22 is connected to the fuel mixture ratio acquisition part 21 so that the fuel mixture ratio acquired by the fuel mixture ratio acquisition part 21 is input. Further, the fuel mixture level determination part 22 determines a fuel mixture level L by comparing the fuel mixture ratio with a threshold V for determining the fuel mixture level L. Specifically, in the embodiment shown in FIG. 2, if the fuel mixture level L is less than a first threshold V1, it is determined that the engine oil is at a normal level. If the fuel mixture ratio is equal to or greater than the first threshold V1 and less than a second threshold V2, it is determined that the engine oil is at a first fuel mixture level L1. If the fuel mixture ratio is equal to or greater than the second threshold V2 and less than a third threshold V3, it is determined that the engine oil is at a second fuel mixture level L2. If the fuel mixture ratio is equal to or greater than the third threshold V3, it is determined that the engine oil is at a third fuel mixture level L3. The first threshold V1 is less than the second threshold V2, and the second threshold V2 is less than the third threshold V3 (V1<V2<V3). The greater the fuel mixture level L, the more fuel the engine oil is diluted with. The fuel mixture level determination part 22 inputs determination result of the fuel mixture level L to the control starting part 23 described later.

The control starting part 23 starts a control part (functional part) configured to perform a control in accordance with the fuel mixture level L, based on the determination result of the fuel mixture level L determined by the fuel mixture level determination part 22. In other words, the control part started by the control starting part 23 additionally performs a control determined for each control part on the engine 1 that is subjected to the predetermined combustion control. As shown in FIG. 2, in the present embodiment, the engine oil state control device 2 includes, as the control part, an oil temperature rise control part 24, an output decrease control part 25, and a start limiting control part 26 described later.

The oil temperature rise control part 24 performs an oil temperature rise control for increasing the evaporation rate of fuel mixed in the engine oil if the fuel mixture ratio is equal to or greater than the first threshold V1. In other words, the oil temperature rise control is performed only if the fuel mixture ratio acquired by the fuel mixture ratio acquisition part 21 is at the first fuel mixture level L1. In the embodiment shown in FIG. 2, the oil temperature rise control part 24 performs the oil temperature rise control if the fuel mixture ratio is equal to or greater than the first threshold V1 and less than the second threshold V2. Further, the oil temperature rise control part 24 is connected to the fuel mixture ratio acquisition part 21 via the fuel mixture level determination part 22 and the control starting part 23. The oil temperature rise control part 24 is also connected to each of the combustion control part 16 (described above), an oil temperature control part 27, and a water temperature control part 28, and transmits instructions to these functional parts to perform the oil temperature rise control. Exemplary methods of the oil temperature rise control will now be described.

In some embodiments, the oil temperature rise control includes an output increase control for increasing the output power of the engine 1 compared to that when the predetermined combustion control is performed. That is, the engine 1 is heated by the output increase control, and the temperature of the engine oil is increased by heat transfer from the heated engine 1. In the embodiment shown in FIG. 2, the oil temperature rise control part 24 is configured to transmit an instruction to increase the output power to the combustion control part 16. The combustion control part 16 receiving the instruction from the oil temperature rise control part 24 increases the fuel injection amount from the injector 51 as compared to that determined under the predetermined combustion control. As a result, the rotational speed or the torque of the engine body 11 is increased, and the output power is increased.

Alternatively, in some embodiments, the oil temperature rise control part 24 may increase a set value of the idling speed of the engine 1 by an instruction to the combustion control part 16, for instance. By increasing the set value of the idling speed, the fuel injection amount during idling is increased, and the amount of heat due to combustion is increased. In this case, the output power of the engine 1 is increased during idling, which does not affect the running of a vehicle, so that the temperature of the engine oil can be further increased by heat of the engine 1.

Further, in a case where the engine 1 is mounted on a construction machine having an attachment (e.g., a hydraulic excavator or a wheel loader) or a forklift, the oil temperature rise control may include a control for increasing the output power of a hydraulic pump (not shown) for driving the attachment or the fork using the engine 1 as a power source. For instance, the output power transferred from the engine 1 to the hydraulic pump may be increased compared to that in a normal state where only the predetermined combustion control is performed.

Further, in some embodiments, the oil temperature rise control includes a combustion temperature rise control for increasing the combustion temperature in the cylinder 12 of the engine 1 compared to that when the predetermined combustion control is performed. That is, the engine 1 is heated by the combustion temperature rise control, and the temperature of the engine oil is increased by heat transfer from the heated engine 1. Specifically, the combustion temperature rise control includes at least one of a control for decreasing the air excess ratio of the engine 1 compared to that determined in accordance with the predetermined combustion control, or a control for increasing the EGR rate of the engine 1 compared to that determined in accordance with the predetermined combustion control. Thus, it is possible to further increase the combustion temperature of fuel.

In the embodiment shown in FIG. 2, in a case where the oil temperature rise control part 24 is configured to transmit an instruction to decrease the air excess ratio to the combustion control part 16, the combustion control part 16 receiving the instruction to decrease the air excess ratio may be configured to decrease (close) the opening degree of the intake throttle 33 compared to that determined by the predetermined combustion control, while keeping the fuel injection amount determined under the predetermined combustion control. For instance, in a case where an exhaust throttle (not shown) is disposed between the turbine T and the exhaust gas treatment device 7 in the exhaust passage 4, the opening degree of the exhaust throttle (not shown) may be decreased instead of or in addition to the opening degree of the intake throttle to decrease the air excess ratio. Alternatively, while keeping the opening degree of the intake throttle 33 or an exhaust valve (not shown) determined under the predetermined combustion control, the fuel injection amount from the injector 51 may be increased compared to that determined by the predetermined combustion control. While keeping the fuel injection amount determined under the predetermined combustion control, the rotational speed of the compressor C may be decreased, using a variable geometry nozzle of the turbocharger 35, compared to that determined by the predetermined combustion control, to decrease the air compression ratio by the turbocharger 35 and thus the intake air amount. Alternatively, the air excess ratio may be decreased by increasing the EGR rate. The air excess ratio may be decreased by combining one or more of the above methods.

Meanwhile, in a case where the oil temperature rise control part 24 is configured to transmit an instruction to increase the EGR rate to the combustion control part 16, the combustion control part 16 receiving the instruction from the oil temperature rise control part 24 may be configured to increase the EGR rate by adjusting the opening degree of the EGR valve 45 so as to increase compared to that determined by the predetermined combustion control. Closing the intake throttle 33 and the exhaust throttle (not shown) or increasing the EGR rate is preferably performed at an operating condition of the engine 1 with little influence on the PM discharge amount, for instance, at a condition where the air excess ratio is high at low load conditions on the engine 1 (engine body 11) and the PM discharge amount does not increase even when the air excess ratio decreases somewhat.

In some embodiments, the oil temperature rise control is performed by controlling a cooling device of the engine 1. The oil temperature rise control in this embodiment will be described with reference to FIG. 4.

In a case where an engine oil circulation system 6 (cooling device) is controlled in the oil temperature rise control, in some embodiments, as shown in FIG. 4, the engine 1 includes an oil circulation line 61 through which the engine oil circulates, an oil cooler 63, disposed on the oil circulation line 61, for cooling the engine oil, and a cooler bypass line 62 bypassing the oil cooler 63 and connecting portions of the oil circulation line 61 upstream and downstream of the oil cooler 63. In such an engine oil circulation system 6, the engine oil stored in the oil pan 69 is sucked by an oil pump 64 disposed on the oil circulation line 61 (pipe) and is supplied to the oil circulation line 61. In the oil circulation line 61, the engine oil passes through the oil cooler 63, then is injected to the piston 13 from an oil injection nozzle 65 to cool the piston 13, and is transported down into the oil pan 69 again. In a large engine, for instance, the injection amount of the engine oil from the oil injection nozzle 65 may be determined by controlling an injection amount adjustment valve 66 disposed between the downstream side of the oil cooler 63 and the oil injection nozzle 65 in the oil circulation line 61 by the engine control ECU 15 or the like. One end of the cooler bypass line 62 (pipe) is connected to the oil circulation line 61 between the oil cooler 63 and the oil pump 64 (upstream of the oil cooler 63), and the other end of the cooler bypass line 62 is connected to the oil circulation line 61 between the oil cooler 63 and the oil injection nozzle 65 (downstream of the oil cooler 63).

Further, the oil temperature rise control includes a control for increasing the flow rate of the engine oil flowing through the cooler bypass line 62 compared to that when the predetermined combustion control is performed. In the embodiments shown in FIGS. 1 to 4, as shown in FIG. 2, as an oil temperature control unit for controlling the temperature of the engine oil, a first flow rate control valve 67 for controlling the flow rate of the engine oil flowing from the oil pump 64 to the cooler bypass line 62 is provided. The first flow rate control valve 67 is a flow rate control valve capable of adjusting the opening degree between the fully open state and the fully closed state. By adjusting the opening degree of the first flow rate control valve 67 by the oil temperature control part 27 of the engine oil state control device 2, the flow rate of the engine oil flowing through the oil cooler 63 can be adjusted. Further, the oil temperature rise control part 24 is configured to transmit an instruction to increase the flow rate of the engine oil flowing through the cooler bypass line 62 to the oil temperature control part 27. The oil temperature control part 27 receiving the instruction from the oil temperature rise control part 24 is configured to increase the opening degree of the first flow rate control valve 67 compared to that when the predetermined combustion control is performed. Thus, by increasing the flow rate of the engine oil bypassing the oil cooler 63, cooling of the engine oil by the oil cooler 63 is reduced. As a result, the engine body 11 is further heated, and the temperature of the engine oil is increased by heat transfer from the engine 1.

The oil temperature control unit may be a heater (not shown), and the engine oil may be heated by the heater. For instance, the heater may be disposed upstream of the oil cooler 63 to heat the engine oil. In this case, the engine oil circulation system 6 may not include the cooler bypass line 62.

With the above configuration, by increasing the flow rate of the engine oil bypassing the oil cooler 63, the degree of cooling of the engine oil by the oil cooler 63 is reduced compared to when the predetermined combustion control is performed, so that the temperature of the engine oil can be increased.

In a case where a cooling water circulation system 9 (cooling device) is controlled in the oil temperature rise control, in some embodiments, as shown in FIG. 4, the engine 1 includes a cooling water circulation line 91 through which cooling water circulates, a radiator 92 (heat dissipation device), disposed on the cooling water circulation line 91, for cooling the cooling water, and a radiator bypass line 93 bypassing the radiator 92 and connecting portions of the cooling water circulation line 91 upstream and downstream of the radiator 92. In such a cooling water circulation system 9, the cooling water circulation line 91 (pipe) supplies cooling water cooled by the radiator 92 to a water jacket (not shown) formed around the cylinder 12, and guides the cooling water discharged from the water jacket (not shown) to the radiator 92 to circulate the cooling water.

Further, the oil temperature rise control includes a control for increasing the flow rate of the cooling water flowing through the radiator bypass line 93 compared to that when the predetermined combustion control is performed. In the embodiments shown in FIGS. 1 to 4, as shown in FIG. 2, as a water temperature control unit for controlling the temperature of the engine oil, a second flow rate control valve 94 for controlling the flow rate of the cooling water flowing to the radiator 92 is provided upstream of the radiator 92 in the cooling water circulation line 91 and downstream of a branch point between the cooling water circulation line 91 and the radiator bypass line 93. The second flow rate control valve 94 is a flow rate control valve capable of adjusting the opening degree between the fully open state and the fully closed state. By adjusting the opening degree of the second flow rate control valve 94 by the water temperature control part 28 of the engine oil state control device 2, the flow rate of the cooling water flowing through the radiator 92 can be adjusted. Further, the oil temperature rise control part 24 is configured to transmit an instruction to increase the flow rate of the cooling water flowing through the radiator bypass line 93 to the water temperature control part 28. The water temperature control part 28 receiving the instruction from the oil temperature rise control part 24 is configured to increase the opening degree of the second flow rate control valve 94 compared to that when the predetermined combustion control is performed. Thus, by increasing the flow rate of the cooling water bypassing the radiator 92, the temperature of the cooling water of the engine 1 is increased. As a result, the engine 1 is heated by the heated cooling water, and the temperature of the engine oil is increased by heat transfer from the heated engine 1.

With the above configuration, by increasing the flow rate of the cooling water bypassing the radiator 92 and thereby increasing the temperature of the cooling water, the engine 1 (engine body 11) is heated. Thus, the temperature of the engine oil can be increased by heat transfer from the heated engine 1.

Alternatively, in a case where the cooling water circulation system 9 (cooling device) is controlled in the oil temperature rise control, in some embodiments, as shown in FIG. 4, the engine 1 includes a cooling water circulation line 91 through which cooling water circulates, a radiator 92, disposed on the cooling water circulation line 91, for cooling the cooling water, and a heater 95 disposed on the cooling water circulation line 91, and the oil temperature rise control includes a control for operating the heater 95. In the embodiments shown in FIGS. 1 to 4, like the embodiments described above, the radiator bypass line 93 bypassing the radiator 92 and connecting portions of the cooling water circulation line 91 upstream and downstream of the radiator 92 is disposed (see FIG. 4). Further, a thermostat 96 with a valve that is closed from the open state at a water temperature above about 80° C. is disposed upstream of the radiator 92 in the cooling water circulation line 91 and downstream of a branch point between the cooling water circulation line 91 and the radiator bypass line 93. The heater 95 is a water temperature control unit and is disposed downstream of the radiator 92 in the cooling water circulation line 91. When the heater 95 is operated, the cooling water is heated by heat of the heater 95. As a result, the engine 1 is heated by the heated cooling water, and the temperature of the engine oil is increased by heat transfer from the heated engine 1.

With the above configuration, the cooling water flowing through the cooling water circulation line 91 is heated by the heater 95, and the engine 1 (engine body 11) is heated by the heated cooling water. Thus, the temperature of the engine oil can be increased by heat transfer from the heated engine 1.

The control flow of the engine oil state control device 2 including the above configuration will be described with reference to FIG. 5. The flow of FIG. 5 is executed at a predetermined timing, for instance, periodically.

In step S1 of FIG. 5, the viscosity of the engine oil is acquired, and in step S2, the fuel mixture ratio is calculated from the viscosity of the oil, as described above. Then, in step S3, the fuel mixture level is determined based on the fuel mixture ratio acquired in step S2. As a result of determination in step S3, if it is determined that the fuel mixture ratio is less than the first threshold V1 in step S4, the engine oil is regarded as being at the normal level, and the procedure proceeds to step S5. In step S5, the predetermined combustion control, such as control to reduce the fuel consumption, is performed as it is. Conversely, if it is determined that the fuel mixture ratio is equal to or greater than the first threshold V1 in step S4, the procedure proceeds to step S6.

In step S6, if the fuel mixture ratio is equal to or greater than the first threshold V1 and less than the second threshold V2, the engine oil is regarded as being at the first fuel mixture level L1, and the procedure proceeds to step S7 to perform the oil temperature rise control. Conversely, in step S6, if it is determined that the engine oil is not at the first fuel mixture level L1, the procedure proceeds to step S8. In step S8, if it is determined that the fuel mixture ratio is equal to or greater than the second threshold V2 and less than the third threshold V3, the procedure proceeds to step S9. In step S9, output limiting process may be performed as described later. Conversely, in step S8, if it is determined that the engine oil is not at the second fuel mixture level L2, the procedure proceeds to step S10. As a result, in the present embodiment, if it is determined that the engine oil is at the third fuel mixture level L3 in step S10, the procedure proceeds to step S11. In step S11, start limiting process may be performed as described later. After step S5, step S7, step S9, or step S11, the control flow ends.

The configuration of the engine oil state control device 2 and details of the oil temperature rise control performed when the fuel mixture ratio is determined to be the first fuel mixture level L1 (first threshold V1<fuel mixture ratio<second threshold V2) have been specifically described. With the above configuration, if the fuel mixture ratio of fuel mixed in the engine oil is equal to or greater than the first threshold V1 and less than the second threshold V2, the oil temperature rise control is performed in addition to the normal control of the predetermined combustion control, so that the temperature of the engine oil is further increased. As a result, evaporation of the mixed fuel in the engine oil is promoted, and the mixed fuel is favorably reduced (removed). Thus, it is possible to not only prevent dilution of the engine oil with the mixed fuel but also recover the engine oil diluted with the mixed fuel. Further, since the fuel mixture ratio in the engine oil is reduced, it is possible to suppress a reduction in the lubricity of the engine oil and a risk of ignition due to a reduction in flash point which result from an increase in the fuel mixture ratio in the engine oil.

A case where the fuel mixture ratio is determined to be the second fuel mixture level L2 (second threshold V2≤fuel mixture ratio≤third threshold V3) will now be described. In some embodiments, as shown in FIG. 2, the engine oil state control device 2 further includes an output decrease control part 25 configured to perform an output decrease control for decreasing the output power of the engine 1 compared to that when the predetermined combustion control is performed, if the fuel mixture ratio is equal to or greater than the second threshold V2 and less than the third threshold V3. That is, if the fuel mixture ratio reaches the second fuel mixture level L2, the engine 1 (engine body 11) is continuously operated while suppressing damage by the output decrease control. In other words, without performing the oil temperature rise control, damage to the engine 1 due to the engine oil is preferentially avoided, rather than recovering the engine oil. More specifically, although the predetermined combustion control is performed in the normal mode when the engine oil is at the normal level, the output decrease control reduces the maximum combustion pressure in the piston 13 (cylinder) and limits the output power of the engine 1 compared to the normal mode. More specifically, the output decrease control may be performed by decreasing (limiting) the fuel injection amount injected from the injector 51 or delaying the injection timing.

With the above configuration, if the fuel mixture ratio is equal to or greater than the second threshold V2 and less than the third threshold V3 (second fuel mixture level L2), the output decrease control is performed in addition to the normal control of the predetermined combustion control, so that the output power of the engine 1 is decreased. Thus, even when the fuel mixture level in the engine oil is high (equal to or greater than the second threshold and less than the third threshold), it is possible to suppress damage to the engine 1 due to dilution of the engine oil with the mixed fuel.

A case where the fuel mixture ratio is determined to be the third fuel mixture level L3 (third threshold V3≤fuel mixture ratio) will now be described. In some embodiments, as shown in FIG. 2, the engine oil state control device 2 further includes a start limiting control part 26 configured to perform a start limiting control for limiting starting of the engine 1 if the fuel mixture ratio is equal to or greater than the third threshold V3 (third fuel mixture level L3). That is, if the fuel mixture ratio reaches the third fuel mixture level L3, since the engine 1 (engine body 11) is very likely to be damaged, the start limiting control is performed to avoid damage to the engine 1 (engine body 11). The start limiting control may include notifying the operator that the engine 1 is likely to be damaged due to dilution of the engine oil with the mixed fuel, and for instance, prompting the operator to replace the engine oil, in order to limit starting of the engine 1. Alternatively, the start limiting control may include directly limiting starting of the engine 1 by prohibiting starting even when the operator turns on the engine 1 to start the engine 1. The start limiting control may include forcedly stopping the operating engine 1 under a predetermined condition, for instance, after a predetermined time elapses from the notification.

With the above configuration, if the fuel mixture ratio is equal to or greater than the third threshold V3, the start limiting control is performed in addition to the normal control of the predetermined combustion control, so that the engine 1 is stopped. Thus, since the engine 1 is prevented from operating, even when the fuel mixture level in the engine oil is particularly high (equal to or greater than the third threshold V3), it is possible to suppress damage to the engine 1 due to dilution of the engine oil with the mixed fuel.

The present invention is not limited to the embodiments described above, but includes modifications to the embodiments described above, and embodiments composed of combinations of those embodiments.

REFERENCE SIGNS LIST

1 Engine
11 Engine body
12 Cylinder
13 Piston
14 Combustion chamber
15 Engine control ECU
16 Combustion control part
17 Forced regeneration control part
2 Engine oil state control device
21 Fuel mixture ratio acquisition part
22 Fuel mixture level determination part
23 Control starting part
24 Oil temperature rise control part
25 Output decrease control part
26 Start limiting control part
27 Oil temperature control part
28 Water temperature control part
3 Intake passage
31 Intake flow rate meter
32 Inter cooler
33 Intake throttle
35 Turbocharger
4 Exhaust passage
43 Passage
44 Cooler
45 Valve
5 Common rail system
51 Injector
52 High-pressure pump
53 Common rail
6 Engine oil circulation system
61 Oil circulation line
62 Cooler bypass line
63 Oil cooler
64 Oil pump
65 Oil injection nozzle
66 Injection amount adjustment valve
67 First flow rate control valve
69 Oil pan
7 Exhaust gas treatment device
81 Sensor
82 Inlet temperature sensor
84 Outlet temperature sensor
88 Differential pressure sensor
9 Cooling water circulation system
91 Cooling water circulation line
92 Radiator
93 Radiator bypass line
94 Second flow rate control valve
95 Heater
96 Thermostat
C Compressor
T Turbine
F Map
V Threshold
V1 First threshold
V2 Second threshold
V3 Third threshold
L Fuel mixture level
L1 First fuel mixture level
L2 Second fuel mixture level
L3 Third fuel mixture level
M Memory

The invention claimed is:

1. An engine oil state control device for controlling a fuel mixture ratio of a fuel mixed in an engine oil of an engine on which a predetermined combustion control is performed, comprising:
a fuel mixture ratio acquisition part configured to acquire the fuel mixture ratio,
an oil temperature rise control part configured to perform an oil temperature rise control for increasing an evaporation rate of the fuel mixed in the engine oil if the fuel mixture ratio is equal to or greater than a first threshold; and
an output decrease control part configured to perform an output decrease control for decreasing an output power of the engine compared to an output power when the predetermined combustion control is performed, if the fuel mixture ratio is equal to or greater than a second threshold, the second threshold being greater than the first threshold,
wherein the oil temperature rise control includes a control for increasing a fuel injection amount during an idling, only if th e fuel mixture ratio is equal to or greater than the first threshold and less than the second threshold, by increasing a set value of an idling speed of the engine so that an amount of heat due to combustion of the fuel during the idling is increased.

2. The engine oil state control device according to claim 1,
wherein the oil temperature rise control includes an output increase control for increasing an output power of the engine compared to an output power when the predetermined combustion control is performed.

3. The engine oil state control device according to claim 1,
wherein the oil temperature rise control includes a combustion temperature rise control for increasing a combustion temperature in a cylinder of the engine compared to a combustion temperature in the cylinder when the predetermined combustion control is performed.

4. The engine oil state control device according to claim 3, wherein the combustion temperature rise control includes at least one of a control for decreasing an air excess ratio of the engine compared to an air excess ratio determined in accordance with the predetermined combustion control, or a control for increasing an EGR rate of the engine compared to an EGR rate determined in accordance with the predetermined combustion control.

5. The engine oil state control device according to claim 1,
wherein the engine includes:
an oil circulation line through which the engine oil circulates;
an oil cooler, disposed on the oil circulation line, for cooling the engine oil; and
a cooler bypass line bypassing the oil cooler and connecting portions of the oil circulation line upstream and downstream of the oil cooler, and
wherein the oil temperature rise control includes a control for increasing a flow rate of the engine oil flowing through the cooler bypass line compared to a flow rate of the engine oil flowing through the cooler bypass line when the predetermined combustion control is performed.

6. The engine oil state control device according to claim 1,
wherein the engine includes:
a cooling water circulation line through which cooling water circulates;
a radiator, disposed on the cooling water circulation line, for cooling the cooling water; and
a radiator bypass line bypassing the radiator and connecting portions of the cooling water circulation line upstream and downstream of the radiator, and
wherein the oil temperature rise control includes a control for increasing a flow rate of the cooling water flowing through the radiator bypass line compared to a flow rate of the cooling water flowing through the radiator bypass line when the predetermined combustion control is performed.

7. The engine oil state control device according to claim 1,
wherein the engine includes:
a cooling water circulation line through which cooling water circulates;
a radiator, disposed on the cooling water circulation line, for cooling the cooling water; and
a heater disposed on the cooling water circulation line, and
wherein the oil temperature rise control includes a control for operating the heater.

8. The engine oil state control device according to claim 1,
wherein the engine includes an oil viscosity sensor for detecting a viscosity of the engine oil, and
wherein the fuel mixture ratio acquisition part calculates the fuel mixture ratio from the viscosity of the engine oil detected by the oil viscosity sensor, based on a map showing a relationship between the viscosity of the engine oil and the fuel mixture ratio.

9. The engine oil state control device according to claim 1,
wherein the engine includes:
an exhaust gas treatment device including a diesel particulate filter, disposed in an exhaust passage of the engine, for collecting particles in an exhaust gas and a diesel oxidation catalyst disposed upstream of the diesel particulate filter; and
a forced regeneration control part configured to, if a predetermined execution condition is satisfied, inject a fuel at a timing that does not contribute to combustion in a combustion chamber of the engine to perform a forced regeneration treatment on the diesel particulate filter.

10. An engine oil state control device for controlling a fuel mixture ratio of a fuel mixed in an engine oil of an engine on which a predetermined combustion control is performed, comprising:
a fuel mixture ratio acquisition part configured to acquire the fuel mixture ratio; and
an oil temperature rise control part configured to perform an oil temperature rise control for increasing an evaporation rate of the fuel mixed in the engine oil if the fuel mixture ratio is equal to or greater than a first threshold,
wherein the oil temperature rise control includes a combustion temperature rise control for increasing a combustion temperature in a cylinder of the engine compared to a combustion temperature in the cylinder when the predetermined combustion control is performed,
wherein the combustion temperature rise control includes at least one of a control for decreasing an air excess ratio of the engine compared to an air excess ratio determined in accordance with the predetermined combustion control, or a control for increasing an EGR rate of the engine compared to an EGR rate determined in accordance with the predetermined combustion control.

11. The engine oil state control device according to claim 10,
wherein the oil temperature rise control includes an output increase control for increasing an output power of the engine compared to an output power when the predetermined combustion control is performed.

12. The engine oil state control device according to claim 10,
wherein the engine includes:
an oil circulation line through which the engine oil circulates;
an oil cooler, disposed on the oil circulation line, for cooling the engine oil; and
a cooler bypass line bypassing the oil cooler and connecting portions of the oil circulation line upstream and downstream of the oil cooler, and
wherein the oil temperature rise control includes a control for increasing a flow rate of the engine oil flowing through the cooler bypass line compared to a flow rate of the engine oil flowing through the cooler bypass line when the predetermined combustion control is performed.

13. The engine oil state control device according to claim 10,
wherein the engine includes:
a cooling water circulation line through which cooling water circulates;
a radiator, disposed on the cooling water circulation line, for cooling the cooling water; and
a radiator bypass line bypassing the radiator and connecting portions of the cooling water circulation line upstream and downstream of the radiator, and
wherein the oil temperature rise control includes a control for increasing a flow rate of the cooling water flowing through the radiator bypass line compared to a flow rate of the cooling water flowing through the radiator bypass line when the predetermined combustion control is performed.

14. An engine oil state control device for controlling a fuel mixture ratio of a fuel mixed in an engine oil of an engine on which a predetermined combustion control is performed, comprising:
 a fuel mixture ratio acquisition part configured to acquire the fuel mixture ratio; and
 an oil temperature rise control part configured to perform an oil temperature rise control for increasing an evaporation rate of the fuel mixed in the engine oil if the fuel mixture ratio is equal to or greater than a first threshold,
 an output decrease control part configured to perform an output decrease control for decreasing an output power of the engine compared to an output power when the predetermined combustion control is performed, if the fuel mixture ratio is equal to or greater than a second threshold and less than a third threshold, wherein the second threshold is greater than the first threshold.

15. The engine oil state control device according to claim 14, further comprising a start limiting control part configured to perform a start limiting control for limiting starting of the engine if the fuel mixture ratio is equal to or greater than the third threshold.

16. The engine oil state control device according to claim 14,
 wherein the oil temperature rise control includes an output increase control for increasing an output power of the engine compared to an output power when the predetermined combustion control is performed.

17. The engine oil state control device according to claim 14, wherein the engine includes:
 an oil circulation line through which the engine oil circulates;
 an oil cooler, disposed on the oil circulation line, for cooling the engine oil; and
 a cooler bypass line bypassing the oil cooler and connecting portions of the oil circulation line upstream and downstream of the oil cooler, and
 wherein the oil temperature rise control includes a control for increasing a flow rate of the engine oil flowing through the cooler bypass line compared to a flow rate of the engine oil flowing through the cooler bypass line when the predetermined combustion control is performed.

18. The engine oil state control device according to claim 14, wherein the engine includes:
 a cooling water circulation line through which cooling water circulates;
 a radiator, disposed on the cooling water circulation line, for cooling the cooling water; and
 a radiator bypass line bypassing the radiator and connecting portions of the cooling water circulation line upstream and downstream of the radiator, and wherein the oil temperature rise control includes a control for increasing a flow rate of the cooling water flowing through the radiator bypass line compared to a flow rate of the cooling water flowing through the radiator bypass line when the predetermined combustion control is performed.

* * * * *